Figure 1:
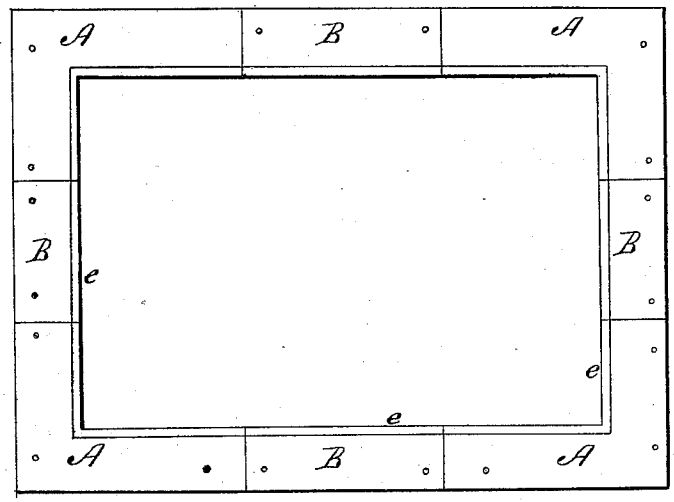
Figure 2:
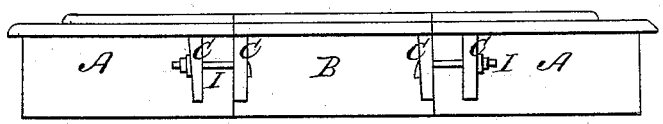
Figure 3:
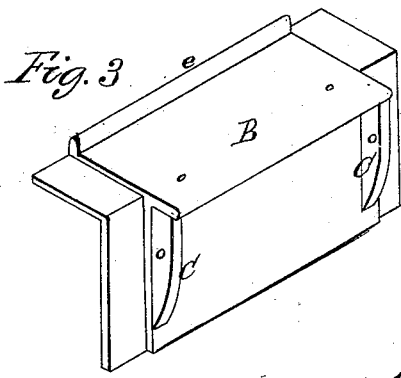

C. F. Espick,
Constructing Chimneys,
N° 78,584. Patented June 2, 1868.

Witnesses:
Cornelius Co.
D. Stockland

Inventor;
Charles F. Espick
per Alexander
Atty

United States Patent Office.

CHARLES F. ESPICK, OF PLYMOUTH, INDIANA.

Letters Patent No. 78,584, dated June 2, 1868.

IMPROVED CHIMNEY-CLASPS.

*The Schedule referred to in these Letters Patent and making part of the same.*

TO ALL WHOM IT MAY CONCERN:

Be it known that I, CHARLES F. ESPICK, of Plymouth, in the county of Marshall, and in the State of Indiana, have invented certain new and useful Improvements in Chimney-Clasps; and do hereby declare that the following is a full, clear, and exact description thereof, reference being had to the accompanying drawings, and to the letters of reference marked thereon.

In the annexed drawings, making part of this specification, A and B represent the sections of a metallic clasp, which I construct and place around the top of the chimneys of houses, to protect them, ornament them, and bind the material of which they are made together. A A represent the corner sections, and B B the intermediate or connecting sections of this clasp. The upper portions of these sections lie upon top of the chimney, that is, upon the brick or stone-work, leaving the flue free. The lower portion forms a flange, which fits snugly against the chimney, upon its outside, so as to bind its parts firmly together.

These sections have formed upon them brackets C C, through which bolts or a wire may be passed to bind the sections to each other. The ends of the sections are so formed that one will overlap the other, so as to form a tight joint.

A bead, e, runs around the inner edge of the upper portion of the sections, to make a finish.

It will readily be seen that these sections may be made in any ornamental manner, and that when they are secured together, and placed around the mouth of a chimney, they protect it from the weather, and bind its parts firmly together.

Having thus fully described my invention, what I claim as new, and desire to secure by Letters Patent, is—

The sections A and B, constructed substantially in the manner specified, of any required size, and bound together around the upper end of a chimney, as and for the purpose set forth.

In testimony that I claim the foregoing, I have hereunto set my hand, this 11th day of March, 1868.

CHARLES F. ESPICK.

Witnesses:
WM. A. LONG,
J. B. LONG.